United States Patent [19]

Bailey, Jr.

[11] 3,972,029
[45] July 27, 1976

[54] CONCURRENT MICROPROCESSING CONTROL METHOD AND APPARATUS

[75] Inventor: Myrl Kennedy Bailey, Jr., North Billerica, Mass.

[73] Assignee: Honeywell Information Systems, Inc., Waltham, Mass.

[22] Filed: Dec. 24, 1974

[21] Appl. No.: 536,126

[52] U.S. Cl. .......................................... 340/172.5
[51] Int. Cl.² ...................................... G06F 9/18
[58] Field of Search ............................. 340/172.5

[56] References Cited
UNITED STATES PATENTS

| | | | |
|---|---|---|---|
| 3,380,025 | 4/1968 | Ragland | 340/172.5 |
| 3,397,391 | 8/1968 | Ottaway et al. | 340/172.5 |
| 3,582,896 | 6/1971 | Silber | 340/172.5 |
| 3,699,526 | 10/1972 | Iskiyan et al. | 340/172.5 |
| 3,713,108 | 1/1973 | Edstrom et al. | 340/172.5 |
| 3,786,434 | 1/1974 | Frye et al. | 340/172.5 |
| 3,868,649 | 2/1975 | Sato et al. | 340/172.5 |
| 3,872,447 | 3/1975 | Tessera et al. | 340/172.5 |
| 3,886,523 | 5/1975 | Ferguson et al. | 340/172.5 |

*Primary Examiner*—Gareth D. Shaw
*Assistant Examiner*—Melvin B. Chapnick
*Attorney, Agent, or Firm*—Faith F. Driscoll; Ronald T. Reiling; Nicholas Prasinos

[57] ABSTRACT

A microprogrammed control for a controller operates with an instruction set which includes a pair of microinstructions, each having an op code field. One of the microinstructions has an op code field coded to specify a load constant operation in which a constant field of the microinstruction is loaded into an auxiliary register coupled to the control store of the microprogrammed control. The other microinstruction has an op code field coded to specify an unconditional return branch operation to a location specified by the contents of the auxiliary register loaded previously. Pairs of these microinstructions arranged in a predetermined sequence are included within each routine of microinstructions stored in the control store which the controller is required to execute in parallel. During operation, each microprogram routine in response to a first one of the microinstructions branches to the other routine at the location specified by the previously loaded contents of the auxiliary register concurrent with loading the auxiliary register with a constant corresponding to a return location with the same microprogram routine. Inclusion of the same sequence of microinstructions in different portions of each microprogram routine causes the control store to alternate between the routines to points specified by the contents of the auxiliary register. The arrangement thereby enables the sharing of the microprogram control between two independently operating microprogram routines.

25 Claims, 4 Drawing Figures

CONCURRENT MICROPROCESSING CONTROL METHOD AND APPARATUS

BACKGROUND OF THE INVENTION

The present invention relates to data processing systems and more particularly to a microprogrammed processing system usable within an input/output controller.

PRIOR ART

As the peripheral subsystems of data processing systems are required to perform a greater variety of operations heretofore performed by the data processing system, it becomes essential to have the subsystem able to execute more efficiently a number of operations in parallel. In order to provide this capability, some prior art peripheral subsystems have included more than one microprogrammed processing unit enabling the execution of at least two independent operations in parallel. While this arrangement is found to improve processing efficiency, it is costly and complex.

Accordingly, it is the primary object of the present invention to provide a method and apparatus to execute a plurality of operations concurrently.

It is a further object of the present invention to provide a method and apparatus which performs execution of two independent microprograms with a minimum increase in the cost and in the apparatus of the peripheral subsystem.

SUMMARY OF THE INVENTION

The above objects are achieved in the preferred embodiment of the invention which comprises a microprogrammed peripheral processor including a microprogrammed control operating with a microinstruction set having a pair of first and second types of microinstructions, each including an op code field. The first type of instruction has an op code field coded to specify an unconditional return branch operation to a location specified by an auxiliary register included in the microprogrammed control previously loaded with a constant in response to the second type of microinstruction. A second type of the pair of microinstructions has an op code field coded to specify a load constant operation and a constant field. Pairs of these microinstructions arranged in a predetermined sequence are included in each routine of microinstructions stored in a control store of the microprogrammed control which the peripheral processor is required to execute concurrently.

The auxiliary register of the microprogrammed serves as an additional source of addresses for the control store and couples to the control store for receiving the constants included within the second type of microinstructions. In operation, the control store during execution of a first one of the independently operated routines in response to the first type of microinstruction branches to the location within a second independently operating routine specified by the contents of the auxiliary register previously loaded in response to the second type of microinstruction. Concurrent therewith, the contents of the auxiliary register are loaded with a constant in response to the second type of microinstruction, the constant specifying a location within the first independently operating routine. Thereafter, the control store in response to the read out of each such types of pairs of microinstructions included in the routines causes the control store to branch to the other of the two independently operating routines and the loading of a constant corresponding to a desired location in the routine being executed prior to the branching operation thereby providing concurrent execution of the routines. This arrangement enables the microprogram control to be shared efficiently between two independently operating microprogram routines. More importantly, the sharing is accomplished with a minimum of additional apparatus which only includes the auxiliary register. Moreover, in some instances, such a register may also be included within a microprogram control to perform other operations. Thus, the arrangement would only require the inclusion of the pairs of the type microinstructions mentioned.

The above and other objects of this invention are achieved in the preferred embodiment described hereinafter. Novel features which are believed to be characteristic of the invention both as to its organization and method of operation together with further objects and advantages will be better understood from the following description when considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
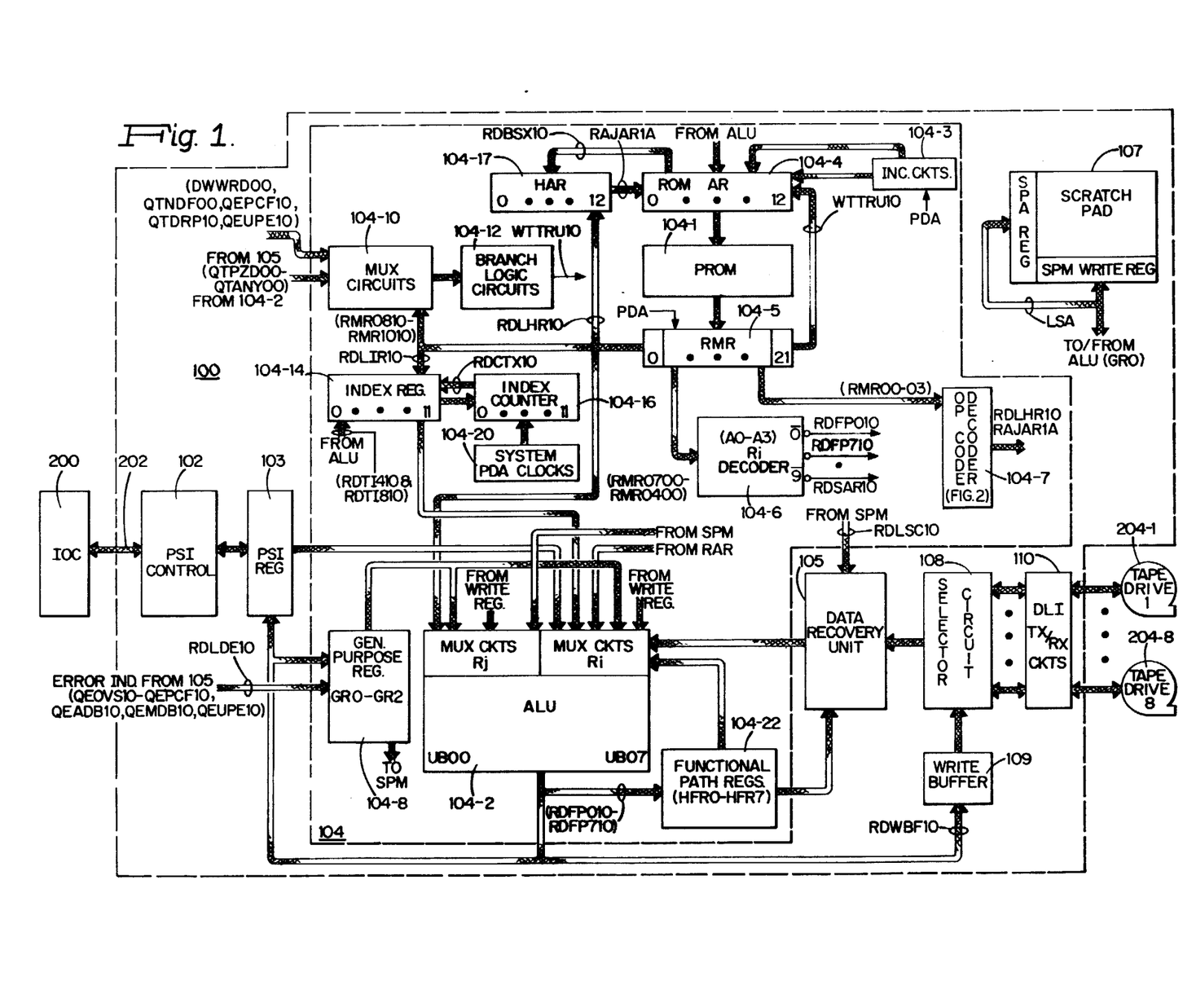
FIG. 1 is a block diagram of a peripheral subsystem which utilizes the principles of the present invention.

FIG. 1 shows in block form, a peripheral processor or peripheral controller 100 which couples to a central processing unit of a data processing system via an input/output processor (IOC) 200. The peripheral controller 100 in response to commands received from the IOC 200 processes data bytes received from any one of a number of magnetic tape devices/drives 204-1 through 204-8 via a selector circuit 108 and receive circuits (not shown) of block 110. The information bytes or frames read from a selected magnetic tape device are processed by a data recovery unit 105. Information to be written on the magnetic tape device is transferred via the ALU 104-2 to a write buffer 109 and thereafter applied to the selected drive via selector circuit 108 and transmit circuit (not shown) included in block 110.

Commands and data are transferred between the IOC 200 and the peripheral controller via a peripheral subsystem interface (PSI) 202. Such transfers are made in response to control signals generated by circuits included within the IOC 200 and the PSI control 102. For the purpose of the present invention, the circuits can be considered conventional in design. For example, the circuits may take the form of the circuits described in a copending patent application titled "Microprogrammable Peripheral Processing System" invented by John A. Recks et al. bearing Ser. No. 425,760 which was filed Dec. 18, 1973 and is assigned to the same assignee as named herein.

As seen from FIG. 1, the controller 100 includes a microprogram processing unit 104 which under the control of microinstruction stored in a programmable read only memory 104-1 performs the necessary operations for transferring information between a selected magnetic tape drive and the IOC 200. For example, in response to command code bytes received from the IOC 200, applied via the PSI control 102, PSI register 103 and an arithmetic and logic unit (ALU) 104-2, microinstructions are read out into a memory register 104-5 and decoded by decoder circuits 104-6 and 104-7. The decoder circuits 104-6 and 104-7 cause a generation of various control signals which condition certain other portions of the controller 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as the data recovery unit 105, for testing the results or progress of the particular operation. Actual testing is accomplished by the branch logic circuits 104-12 which for the purposes of the present invention can be considered conventional in design.

Also, signals representative of addresses contained within various types of microinstructions are applied from register 104-5 via a bus to a register 104-14. The register 104-14 is an index register which is loaded via register 104-5 in response to a subcommand signal RDLIR10 or via the ALU 104-2 in response to subcommand signal RDT1410. The register 104-14 couples to the index counter 104-16 and is used to provide the required timing strobe signals necessary for writing or reading information bytes to and from the write buffer 109 and the date recovery unit 105 respectively. The index counter 104-16 is decremented in response to PDA clocking signals generated by multi frequency system clock circuits 104-20. Additionally, the clock circuits 104-20 provide PDA clocking signals for timing various operations within the system such as the loading the contents of register 104-5 and incrementing the contents of address register 104-4. For the purpose of the present invention, these clocking circuits can be considered conventional in design.

The register 104-17 is used as a history address register which allows proper sequencing through microinstructions stored in memory 104-1 as explained herein. For example, the history register 104-17 is operative to store a return branch address from the memory local register 104-5 until such time that the address is to be transferred to the read only memory address register 104-4. This address when transferred causes the register 104-4 to condition the memory 104-1 to select again a previous location within the memory allowing the continuance of a particular operation. The address contents of the address register 104-4 are incremented by one by increment circuits included within block 104-3 of FIG. 1 in response to the PDA clocking signals. These circuits may be also considered conventional in design.

As seen from FIG. 1, the ALU 104-2 receives and delivers signals to the registers shown. The signals which are to be applied as operand inputs to the ALU 104-2 are selected via multiplexer circuits included therein. The ALU 104-2 and multiplexer circuits can be considered conventional in design and may for example take the form of circuits disclosed in a text titled "The Integrated Circuits Catalog for Design Engineers", published by Texas Instruments, Inc., dated 1972.

The ALU 104-2 is connected to provide output signals to a plurality of functional path registers 104-22 which are used for control purposes such as for providing control signals to the data recovery unit 105 and storing hardware error conditions during the assembling of data bytes received from a selected magnetic tape device. Each bit in each of the individual registers is used to indicate or to initiate a specific event or operation. The contents of these registers are examined by the microprogram processing unit 104 via branch circuits in order to ascertain the state of the controller during an operation as well as being used for internal timing and for enabling the execution of commands.

Additionally, the ALU 104-2 is also connected to transmit and receive signals to and from a plurality of general registers 104-8 (i.e. register GR0 through GR2) which are used for storage of certain record processing information. More specifically, register GR0 is used to control the transfer of input and output data signals to and from a scratch pad memory 107. Hence, it serves as a memory local register for scratch pad memory 107. Register GR1 serves as an input buffer register for the scratch pad memory 107. Also, register GR2, similar to register GR0, provides temporary storage of information to be stored in the scratch pad memory 107.

The scratch pad memory 107 provides temporary storage for data, various control information and parameters required for executing read and write operations. As seen from FIG. 1 and mentioned above, both address and data are transmitted to and from the scratch pad memory 107 via the ALU 104-2 and general registers. The scratch pad memory 107 is of solid state construction and has 512 storage locations each containing 10 bit positions. The first 32 storage locations serve as a data buffer when the controller 100 is operating in a data mode (i.e. transferring or receiving data characters of a record). When in this mode, addressing of the scratch pad memory 107 takes place via a pair of address counters, write and read counters not shown. The contents of the read address counter are used to read out information from the locations of the scratch pad memory while the contents of the write address counter are used to write information into the scratch pad memory. For the purposes of the present invention, the operation of these counters for addressing the scratch pad memory 107 can be considered convention in design.

The remaining storage locations of the scratch pad memory 107 are used for storage of device constants, control parameters for control of the controller and associated tape drives. Additionally, the scratch pad memory can be addressed by a scratch pad address register which receives information from the ALU 104-2 and the register is used when either control constants and parameters are to be sent to portions of the controller 100 or used for updating certain status information previously stored in scratch pad memory 107.

Figure 2:
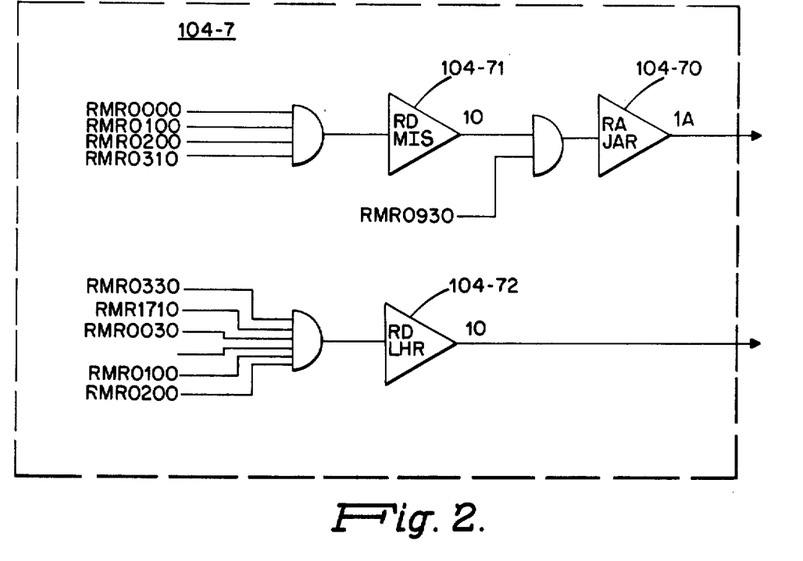
FIG. 2 shows in greater detail the circuits of FIG. 1 used to generate subcommand signals in accordance with the present invention.

Op Code Decoder Circuits — FIG. 2

FIG. 2 shows in greater detail, a portion of the logic gate circuits included within the op code decoder 104-7. These circuits generate the signals RAJAR1A and RDLHR10 which perform the loading of the contents of the history register into ROM address register 104-4 and the loading of a constant value into history register 104-17 read out from register 104-5.

Referring to FIG. 2, it is seen that signal RAJAR1A is forced to a binary ONE by a pair of AND gates and amplifier circuits 104-70 and 104-71 when a signal RDMIS10 is a binary ONE indicating that the microinstruction read out and stored in read only memory register 104-5 has an all zero op code and bit 3 set to a binary ONE in addition to having bit 9 (i.e. signal RMR0930) set to a binary ONE. An AND gate and amplifier circuit 104-72 forces signal RDLHR10 to a binary ONE when bit 0, bit 3 and bit 17 of the microinstruction read out into read only memory register 104-5 are binary ONES (i.e. signals RMR0030, RMR0330 and RMR1710 are binary ONES) and bits 1 and 2 of the microinstruction are binary ZEROS (i.e. signals RMR0100 nd RMR0200 are binary ONES).

Microinstruction Formats

Before describing the operation of the system of FIG. 1, the different types of microinstructions utilized by the present invention and their formats will be described with reference to FIG. 3.

Figure 3:
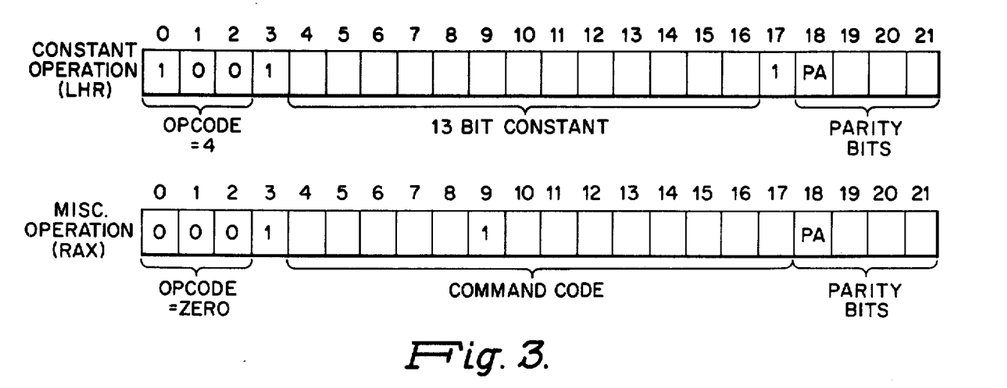
FIG. 3 shows the formats of a pair of microinstructions in accordance with the present invention.

Referring to FIG. 3, there is shown a constant type microinstruction which is normally used by the processing unit 104 during the performance of logical or arithmetic operations. Additionally, this microinstruction is used to load a constant into history address register 104-17. As seen from the figure, the load history register (LHR) microinstruction has an op code of 4 and has a constant field which includes bits 4 through 16. Bits 3 and 17 of the microinstruction are set to binary ONES to distinguish this microinstruction from a conventional constant microinstruction used during logical and arithmetic operations. Bits 18 through 21 are parity bits. More specifically, bit 18 is an address parity bit while bits 19, 20 and 21 constitute the parity bits for different bits of the microinstruction and are used to check on the operation of read only memory 104-1.

The other microinstruction is a return to branch and execute (RAX) microinstruction which has an op code of ZERO. Bits 3 and 9 of the microinstruction are set to binary ONES to distinguish this microinstruction from other microinstructions with op codes of ZERO. Bits 4 through 17 define the command code of the RAX microinstruction. Bits 18 through 21 constitute data parity bits.

In general, the control store 104-1 in response PDA clock signals from the system clocks 104-20 begins a cycle of operation in which the contents of a location specified by the contents of the address register 104-4 are read out to memory register 104-5 during the following cycle (i.e. a delay of one PDA interval). Concurrent with the read out of the microinstruction into register 104-5, the contents of the memory address register 104-4 are either incremented by one in response to a PDA clocking signal or the memory address register is loaded with an address from any one of the plurality of address sources including history address register 104-17, ALU 104-2 and register 104-5 of FIG. 1 in response to signals generated by op code decoder 104-7.

It will be appreciated that in addition to the microinstructions of FIG. 3, the control store 104-1 contains additional types of microinstructions used by the ALU 104-2 in performing logical and arithmetic operations. These microinstructions and operations performed in response to such microinstructions can be considered conventional for the purpose of the present invention.

DESCRIPTION OF OPERATION OF THE PREFERRED EMBODIMENT

Figure 4:
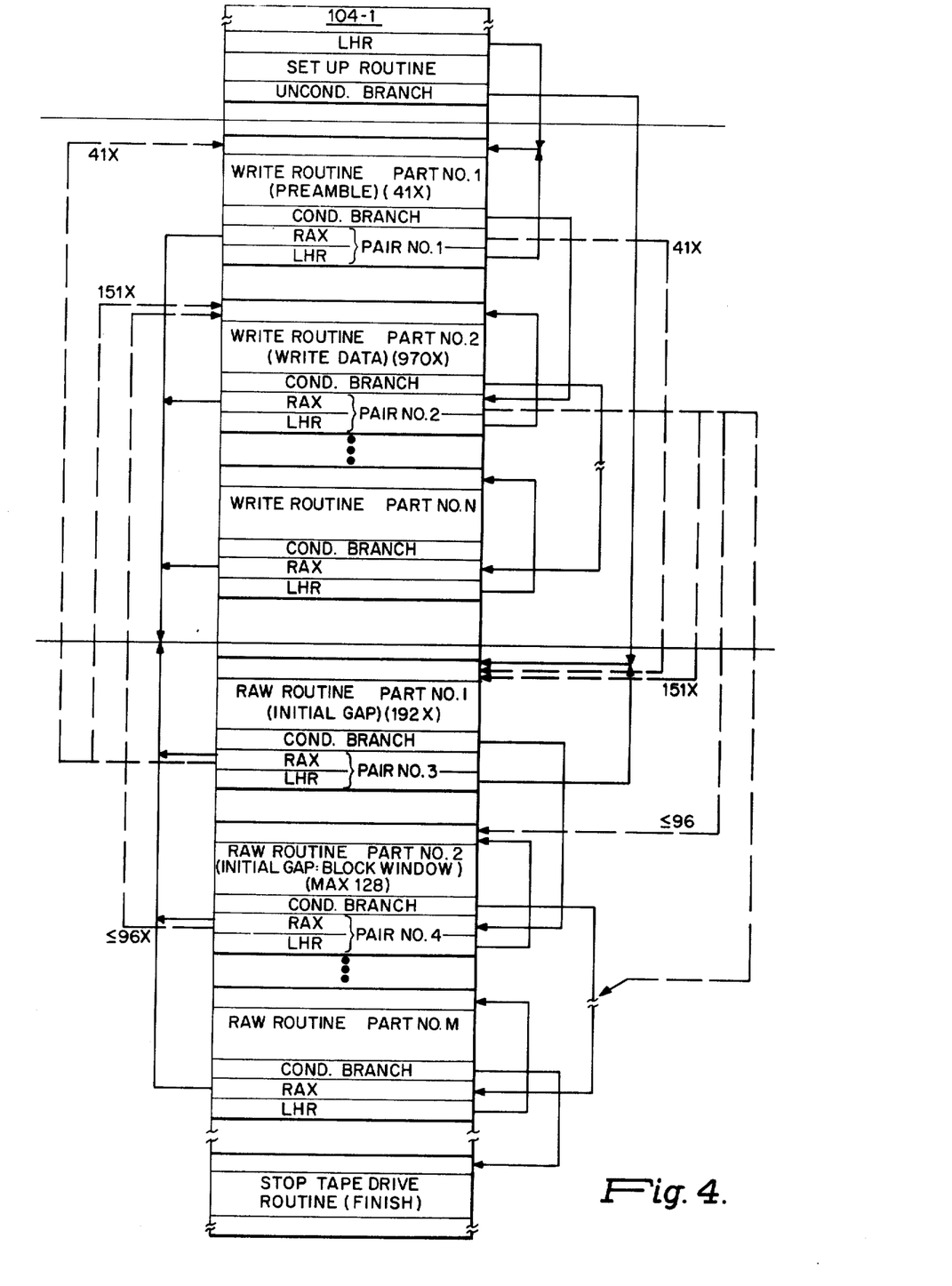
FIG. 4 is a flow chart used in explaining the operation of the present invention.

With reference to FIG. 4, the operation of the subsystem of FIG. 1 incorporating the principles of the present invention will now be described. During the processing of write commands, the controller 100 is required to execute at least two independent microprogram routines. A first routine termed a write routine in FIG. 4 enables the controller 100 to transfer data bytes received from the IOC via PSI 202 into scratch pad memory 107 and from scratch pad memory 107 to a selected one of the magnetic tape devices 204-1 through 204-8. Concurrent with this, the controller is required to perform monitoring operations during the execution of read after write (RAW) checking operations. Such checking operations involve the data recovery unit 105 processing data bytes received from the selected tape device.

Because of the time constraints involved and the limited amount of buffer storage normally available, both the write and read after write operations are required to proceed independently in parallel. The arrangement of the present invention allows both the write routine and RAW routine stored in read only memory 104-1 to be executed in parallel by employing sequences of RAX and LHR microinstructions within such routines as explained herein.

Referring to FIG. 4, it is seen that the read only memory 104-1 stores a plurality of routines which include a number of parts n of the write routine and a number of parts m of the read after write (RAW) routine in addition to a "set up" routine and a "finish" routine. As explained herein, the solid lines in FIG. 4 represent the sequencing of routines generally while the dotted lines represent the sequencing of routines for a specific case.

It is seen from FIG. 4 that the controller 100 initially executes the "set up" routine or "interface" routine of microinstructions which in addition to performing operations relating to initial conditions or one of the routines (writer routine) loads the history address register 104-17 with initial return location and causes the read only memory 104-1 to branch to a first one of the routines to be executed.

More specifically, the read out of the LHR microinstruction causes AND gate 104-72 of the op code decoder circuit 104-7 to force signal RDLHR10 to a binary ONE which loads the constant field of the LHR microinstruction into history address register 104-17. During the same cycle of operation, the increment circuits of block 104-3 in response to a PDA clock pulse increment by one the contents of the ROM address register for read out of an unconditional branch microinstruction. This microinstruction which can be considered conventional causes the control store 104-1 to branch to a first location in the first part of the RAW routine to be executed.

The routine designated RAW routine part No. 1 in FIG. 4 monitors the initial gap interval on the tape medium for a distance of 0.12 inches. As indicated in FIG. 4, this routine is executed 192 times or for a time interval corresponding to 0.12 inches which approximates 192 "frame times" (i.e. time for transferring 192 frames or bytes). The next portion of the RAW routine designated RAW routine part No. 2 in FIG. 4, is executed a maximum of 128 frame times with the length of time for execution being indeterminate. This routine monitors the state of a signal during the initial gap interval to detect for the beginning of a block of information. Thus, when the beginning of block is detected prior to 128 frame times, the controller stops its execution of this routine and begins execution of another the portion of the RAW routine.

The first part of the write routine (i.e. the preamble portion) designated write routine part No. 1 in FIG. 4 is executed 41 times and writes on the tape medium 41 frames of preamble consisting of 40 all ZERO frames and 1 all ONES frame. The next portion of the write routine (i.e. write data portion) designated write routine part No. 2 writes the data frames on the tape medium until the transfer of data bytes from the IOC 200 terminates. This part of the routine is executed approximately 970 times when writing 1000 bytes as discussed herein, the actual number of times being indeterminate. The reason is that the number is dependent upon the number of transfers of data bytes from PSI register to scratch pad memory 107 and the amount of data buffer storage included in scratch pad memory 107. This is, this part of the write routine includes a sequence of microinstructions for transferring bytes received from the IOC 200 between the PSI bus 202 and scratch pad memory 107. Thus, execution of this sequence depends upon certain conditions relating to when a byte has been received and when buffer storage is available in scratch pad memory 107.

In general, the setup routine causes the read only memory 104-1 to branch to RAW routine part No. 1. Following each execution of the microinstructions in this portion of the RAW routine, the read out of the RAX microinstruction from the read only memory 104-1 returns the memory 104-1 to an appropriate portion of the write routine specified by the previously loaded contents of history register 104-17. That is, each time the read only memory 104-1 reads out a RAX microinstruction into register 104-5, this microinstruction causes the AND gates 104-70 and 104-71 of op code decoder circuit 104-7 to force signal RAJAR1A to a binary ONE. This signal causes the previous loaded contents of history register 104-17 to be loaded into ROM address register 104-4. During the same cycle of operation, the read only memory 104-1 in response to a PDA clocking pulse reads out the LHR microinstruction into memory register 104-5.

During the next cycle of operations, the op code decoder circuit 104-7 via AND gate 104-72 forces signal RDLHR10 to a binary ONE. This in turn conditions the history register 104-17 to receive the constant bits 4 through 16 of the LHR microinstruction read out of read only memory 104-1 into register 104-5. During the same cycle, the PDA clocking pulse conditions the increment circuits 104-3 to increment by ONE the previous constant now stored in the ROM address register 104-4.

In a similar fashion, following each execution of the microinstructions in the preamble write routine part No. 1, the read out of the RAX microinstruction from read only memory 104-1 branches the memory 104-1 to an appropriate portion of the RAW routine specified by the previously contents of history register 104-17 concurrent with loading history register 104-17 with a constant for returning to the write routine.

The conditional branch microinstructions also included within each of the portions of the write routine and RAW routine cause the read only memory to stop execution of those portions of the routines and sequence to the next portions of the same routines as illustrated by the solid lines in FIG. 4. Also, a conditional branch microinstruction of RAW routine part m causes the read only memory 104-1 to branch to a finish routine which corresponds to a stop tape drive routine in FIG. 4 upon completing the write operation.

Now, FIG. 4 will be discussed relative to a specific example in which the controller 100 writes 1000 bytes on tape. The sequencing of read only memory 104-1 during the execution of this write operation is shown by the dotted lines in FIG. 4.

Referring to FIG. 4 it is seen that the controller 100 executes write routine part No. 1 (write preamble) 41 times and the write routine part No. 2 (write data) approximately 970 times (i.e. 1000-30 frames of buffer storage in scratch pad 107). Also, the controller 100 executes RAW routine part No. 1 (initial gap noise check) 192 times (i.e. a distance of .12 inches written at 1600 bits per inch is 192 frames) and the RAW routine part No. 2 less than 128 times (a distance of 0.08 inches written at 1600 bits per inch is 128 frames). As mentioned, the number of times the RAW routine No. 2 is executed is a function of when the beginning of block is detected (i.e. execution of the routine stops under two conditions).

From FIG. 4 and the above discussion, it can be seen that the pair of microinstructions designated No. 3 included in RAW routine part No. 1 causes the read only memory 104-1 to return to write routine part No. 1, 41 times and to write routine part No. 2, 151 times. In a similar fashion, the part of microinstructions designated No. 4 causes the memory 104-1 to always return to write routine part No. 2.

Also, as illustrated, the pair of microinstructions designated No. 1 cause the memory 104-1 to return always to RAW routine part No. 1. The pair of microinstructions designated No. 2 causes the controller 100 during its execution of write routine part No. 2 to return to RAW routine part No. 1 151 times, to RAW routine part No. 2 less than 128 times and to other RAW routines, not shown, for the duration of executing the routine 970 times.

It can be seen from the above that when the controller 100 was not writing 1000 bytes but only 10 bytes, execution of write routine part No. 2 would be completed before RAW routine part No. 1. Thus, the memory 104-1 would return to an entirely different part of write routine part No. 1. From the example, it is seen that for each frame interval defined by a count loaded into index counter 104-16 (i.e. an interval corresponding to a predetermined number of PDA clock pulses), the controller 100 executes one part of the write routine and one part of the RAW routine. It is seen that the sequencing through the different parts of each routine is independent of the other routine. For example, during the execution of the write routine, the controller causes 41 frames of preamble to be written on tape and then 970 data frames independent of conditions occurring during execution of the RAW routine. Similarly, during execution of the RAW routine, the controller monitors 192 frame intervals during the initial gap and then continues monitoring the same period for detecting the beginning of a block independent of conditions happening during execution of the write routine.

By including pairs of these microinstructions, the processing unit 104 is able to execute both the write routine and read after write routine concurrently. For further information regarding the details of these routines, reference may be made to the patent application of Myrl Kennedy Bailey Jr. and George J. Barlow titled "Improved Retry Method and Apparatus" bearing Ser. No. 536,281, filed on even date herewith and assigned to the assignee of the present invention.

From the above, it is seen that the method and apparatus of the present invention provides for efficient sharing of processor resources by two independent microprogram routines.

It will be obvious to those skilled in the art that many changes may be made to the preferred embodiment of the invention without departing from its teachings. For example, the sequence of two microinstructions may be combined in a single microinstruction coded to generate those signals necessary to perform both the branching operation and the loading of a constant into the history address register. It will also be appreciated that the teaching of the present invention are applicable to a microprogram control utilizing different microinstruction formats and which utilizes different construction. It is only essential that such control include an auxiliary register which couples to the output of the control store of the microprogrammed control.

While in accordance with the provision and statutes there has been illustrated and described the best form of the invention known, certain changes may be made without departing from the scope of the invention as set forth in appended claims and that in some cases, certain features of the invention may be used to advantage without a corresponding use of other features.

What is claimed is:

1. A peripheral controller coupled to a first interface for receiving bytes from a processing system and coupled to a second interface for transferring said received bytes to an output device, said controller comprising:
an addressable control store including a plurality of addressable locations for storing microinstructions of an initial sequence and microinstructions of at least two microprograms including microinstructions for generating signals for receiving and transferring bytes from said first and second interfaces;
an address register connected to said store for storing an address for accessing said locations;
an output register coupled to said store for temporarily storing the microinstruction contents of an accessed location during a cycle of operation;
an auxiliary register coupled to said output register and to said address register; and,
decoder means coupled to said output register for generating control signals in response to decoding microinstructions read out into said output register, said decoder means including first means operative upon the read out of a predetermined one of said microinstructions contained in said initial sequence to generate a first one of said control signals for loading said auxiliary register with signals corresponding to a constant field included in said predetermined one of said microinstructions, said constant field of said predetermined one of said microinstructions being coded to specify a location of a microinstruction in one of said microprograms, said address register being conditioned by a first type of branch microinstruction in said initial sequence to load said address register with an address to branch said control store to a microinstruction stored in an initial location within the other microprogram and said decoder means further including second means operative during a cycle of operation upon read out of a predetermined one of said microinstructions contained in said other microprogram to generate a second one of said control signals for loading said address register with the contents of said auxiliary register and said first means generating said first control signal during a next cycle of operation upon read out of a next microinstruction stored in the next location of said other microprogram for again loading said auxiliary register with signals corresponding to another constant field included in said next microinstruction read out into said output register, said constant field of said next microinstruction being coded to specify a return location of a microinstruction in said other microprogram.

2. The controller of claim 1 wherein said first type of branch microinstruction includes an opcode coded to specify an unconditional type of branch operation.

3. The controller of claim 1 wherein each of said microinstructions is coded to include a plurality of fields, said predetermined one of said microinstructions contained in said initial sequence and said next microinstruction are first types of microinstructions, each coded to include an op code field and said constant field and wherein said predetermined one of said microinstructions contained in said other microprogram is a second type of microinstruction coded to include an op code field and one other field.

4. The controller of claim 3 wherein said address register includes a predetermined number of bit positions and each of said constant fields of said microinstructions is coded to contain a number of bits corresponding to said predetermined number of bit positions for designating an address for causing said control store to address any one of said plurality of addressable locations.

5. The controller of claim 3 wherein said first and second means of said decoder means each include logic gating means connected to said output register for receiving signals corresponding to said op code fields of said microinstructions read out into said output register and said logic gating means of said first and second means being operative in response to said first and second types of microinstructions to generate said first and second control signals respectively.

6. The controller of claim 5 wherein said logic gating means of said first and second means, each includes a number of series connected AND gates for logically combining signals representative of said op code field with predetermined number of other signals from other fields of the same microinstruction for distinguishing said microinstructions of the same type.

7. The controller of claim 3 wherein said two microprograms each have a plurality of parts containing microinstructions, said microinstructions being coded to specify predetermined operations, said microinstructions upon being read out to said output register conditioning said decoder means to generate signals for causing said controller to perform said predetermined operations for receiving and transferring bytes from said first and second interfaces, each of said parts including a pair of said first and second types of microinstructions arranged in a predetermined sequence for enabling said controller to execute said first and second microprograms in parallel.

8. The controller of claim 7 wherein said predetermined sequence corresponds to said second type of microinstruction followed by said first type of microinstruction, and wherein said controller further includes increment means coupled to said address register and clocking means coupled to said increment means and to said output register, said increment means being conditioned by said clocking means during execution of said second type of microinstruction to increment by one the contents of said address register for read out of said first type of microinstruction in said pair.

9. The controller of claim 7 wherein each of said parts is coded to include at least a second type of branch microinstruction, said decoder means being operative in response to the read out of said second type of branch microinstruction during the execution of one of said microprograms to condition said address register to cause said control store to branch to microinstructions of a next part within the same one of said microprograms to be executed by said controller.

10. The controller of claim 9 wherein said address register causes said control store to branch to said pair of said first and second types of microinstructions of said next part of said microprogram, said decoder means being operative in response to said pair of microinstructions read out during first and second cycles of operation to generate said first and second control signals respectively for loading said address register from said auxiliary register to cause said control store to branch to a location of a microinstruction within the other microprogram specified by the contents of said auxiliary register and to load said auxiliary register with a constant contained within one of said pair of microinstructions designating a return location of a microinstruction within said next part of said microprogram.

11. The controller of claim 9 wherein said second type of branch microinstruction is coded to specify a branch condition designating the occurrence of a condition relating to said part of the microprogram being executed by said controller.

12. A peripheral control for use in a peripheral controller operative to perform at least first and second operations concurrently for transferring information between a data processing system and a storage device, said control comprising:
a memory for storing in a plurality of memory locations first and second groups of microinstruction sequences of a pair of microprograms which are required to be executed to perform said two operations concurrently, each said group including a predetermined pair of microinstructions, said memory including an address register coupled to said memory for storing an address used to access said locations and an output register coupled to said memory for temporarily storing the microinstruction contents of an accessed location during a cycle of operation;
an auxiliary register coupled to said output register and to said address register, said auxiliary register for storing constants defining the locations of microinstructions within said microprograms; and,
decoder means coupled to said output register for generating control signals in response to decoding microinstructions read out to said output register, said decoder means including;
first means operative upon the read out of a first one of said microinstructions in each pair included in said first and second groups of microinstructions to generate a first one of said control signals for loading the contents of said auxiliary register into said address register to access a microinstruction within one of said pairs of microprograms not being executed during previous cycles of operation; and,
second means operative upon the read out of a second one of said microinstructions in said each pair to generate a second one of control signals for loading said auxiliary register with a constant from said output register coded for specifying a return location of a microinstruction within the microprograms being executed.

13. The peripheral control of claim 12 wherein said memory includes an initial sequence of microinstructions, said initial sequence being coded to include one microinstruction of the same type as said second one of said microinstructions in said pair and an unconditional branch type microinstruction,
said controller address register being loaded with an address to read out microinstructions of said initial sequence prior to read out of microinstructions of said first and second microprograms, said second means being operative in response to said one microinstruction to generate said second one of said control signals for loading said auxiliary register with a constant specifying a microinstruction of an initial location within one of said pairs of microprograms and said decoder means being operative in response to said unconditional branch type microinstruction to load said address register with an address to cause said memory to branch to the other one of said pair of microprograms.

14. The peripheral control of claim 13 wherein each of said microinstructions is coded to include a plurality of fields, said one microinstruction contained in said initial sequence and said second microinstruction of said each pair are first types of microinstructions, each coded to included an op code field and said constant and wherein said first one of said each pair is a second type of microinstruction coded to include an op code field and one other field.

15. The peripheral control of claim 14 wherein said address register includes a predetermined number of bit positions and each constant of each of said first type of microinstructions being coded to contain a number of bits corresponding to said predetermined number of bit positions for designating an address for causing said control store to address any one of said plurality of addressable locations.

16. The peripheral control of claim 14 wherein said first and second means of said decoder means each include logic gating means connected to said output register for receiving signals corresponding to said op code fields of said pairs of microinstructions read out into said output register and said logic gating means of said first and second means being operative in response to said first and second type of microinstructions to generate said control signals.

17. The peripheral control of claim 16 wherein said logic gating means of said first and second means each includes a number of series connected AND gates for logically combining signals representative of said op code field with a predetermined number of other signals from other fields of the same microinstruction for distinguishing said microinstructions of the same type.

18. The peripheral control of claim 14 wherein said groups of said pair of microprograms each contain microinstructions which when read out to said output register condition said decoder means to generate signals for causing said decoder means to generate signals to condition said controller to execute said first and second operations in parallel.

19. The peripheral control of claim 18 wherein said control further includes increment means coupled to said address register means and clocking means coupled to said increment means and to said output register, said increment means being conditioned by said clocking means during execution of said first type of microinstruction to increment by one of the contents of said address register for read out of said second type of microinstruction in said pair.

20. The peripheral control of claim 18 wherein each of said groups include at least one type of branch microinstruction, said decoder means being operative in response to the read out of said one type of branch microinstruction during the execution of one of said microprograms to condition said control store to branch to microinstructions of a next group within the same one of said microprograms being executed.

21. The peripheral controller of claim 20 wherein said one type of branch microinstruction is a branch on condition microinstruction for specifying the occurrence of a condition relating to said group of microinstructions being executed.

22. The peripheral control of claim 20 wherein one of said pair of microprograms includes microinstructions for transferring the bytes of a block from said peripheral control to said storage device and the other one of said pairs of microprograms includes microinstructions for monitoring the transfer of bytes received by said peripheral control from said device.

23. The method of organizing a microprogrammable peripheral controller for facilitating the handling of multioperations, said controller having a memory including a plurality of locations for storing groups of microinstructions for at least a pair of microprograms, said memory having an address register for accessing said locations and an output register for temporarily storing the microinstruction contents of an accessed location, said method comprising the steps of:

a. inserting a predetermined number of microinstructions into each group of microinstructions of each of one of said pair of microprograms stored in said memory;

b. storing signals corresponding to a constant received from said output register in an auxiliary register coupled to said address register;

c. coding said predetermined number of microinstructions stored in said memory to specify the loading of said address register with a constant previously stored in said auxiliary register specifying a location of one microinstruction of one of said microprograms concurrent with specifying the loading of said auxiliary register with a constant specifying a return location of a microinstruction in the other of said microprograms; and, d. decoding said predetermined number of microinstructions by decoding circuits coupled to said output register to generate signals for loading concurrently said address register and said auxiliary register for independent concurrent execution of said pair of microprograms for performing said multioperations by said controller.

24. The method of claim 23 wherein said method further includes the step of inserting an initial sequence of microinstructions into said memory for execution by said controller, said initial sequence being coded to include a first microinstruction including a constant field and an op code field coded to specify the loading of said auxiliary register with said constant field specifying a starting location within one of said pair of microprograms and a second microinstruction corresponding to an unconditional branch microinstruction coded to include an op code field for specifying the loading of said address register with an address for branching said memory to a microinstruction stored in a starting location in said other pair of microprograms.

25. The method of claim 24 wherein step (a) further includes the steps of inserting two microinstructions as said predetermined number and coding each of said microinstructions to include a plurality of fields, said microinstructions contained in said initial sequence and one of said predetermined number of microinstructions are first type of microinstructions, said each first type of microinstructions coded to include said op code field and said constant field and wherein the other one of said predetermined number of microinstructions is a second type of microinstruction, said each second type of microinstruction being coded to include said op code field and one other field including said address.

* * * * *

UNITED STATES PATENT OFFICE
CERTIFICATE OF CORRECTION

PATENT NO. : 3,972,029
DATED : July 27, 1976
INVENTOR(S) : Myrl Kennedy Bailey, Jr.

It is certified that error appears in the above-identified patent and that said Letters Patent are hereby corrected as shown below:

Column 10, line 3, after "program" insert -- , --.

Column 12, line 15, delete "grams" and insert --gram--.

Column 14, line 40, delete "microinstructions" and insert --microinstruction--.

Signed and Sealed this

Fifteenth Day of March 1977

[SEAL]

Attest:

RUTH C. MASON
Attesting Officer

C. MARSHALL DANN
Commissioner of Patents and Trademarks